United States Patent
Ku et al.

(10) Patent No.: US 7,485,996 B2
(45) Date of Patent: Feb. 3, 2009

(54) POSITION RETENTION DEVICE

(75) Inventors: Hung-Chung Ku, Taipei (TW);
Chih-Kai Hu, Taipei (TW); Pin-An Hsieh, Taipei (TW)

(73) Assignee: Asustek Computer Inc., Taipei (TW)

( * ) Notice: Subject to any disclaimer, the term of this patent is extended or adjusted under 35 U.S.C. 154(b) by 383 days.

(21) Appl. No.: 11/438,331

(22) Filed: May 23, 2006

(65) Prior Publication Data
US 2006/0290217 A1 Dec. 28, 2006

(30) Foreign Application Priority Data
Jun. 24, 2005 (TW) .............................. 94121073 A

(51) Int. Cl.
H02K 49/00 (2006.01)
H02P 15/00 (2006.01)
(52) U.S. Cl. ..................................... 310/103
(58) Field of Classification Search ......... 310/103–105; 464/29
See application file for complete search history.

(56) References Cited

U.S. PATENT DOCUMENTS 7,274,788 B2 * 9/2007 Schanz et al. ............... 379/445

* cited by examiner

Primary Examiner—Javaid Nasri
(74) Attorney, Agent, or Firm—Birch, Stewart, Kolasch & Birch, LLP

(57) ABSTRACT

A position retention device includes a pivot member having a mounting axle, a cylindrical seat, a cylindrical housing and an annular member. A cylindrical seat is mounted co-axially on the mounting axle of the pivot member, and has pluralities of circumferentially formed and alternately disposed north and south pole sectors. A cylindrical housing is mounted co-axially and rotatably on the mounting axle of the pivot member. An annular member is disposed within the annular receiving chamber in the cylindrical housing for simultaneous rotation with the cylindrical housing. The annular member has pluralities of circumferentially formed and alternately disposed north and south pole sectors. Position of the cylindrical housing is retained stationarily with respect to the cylindrical seat by virtue of attraction between adjacent two of the north or south pole sectors of the cylindrical seat and the annular member.

13 Claims, 6 Drawing Sheets

POSITION RETENTION DEVICE

FIELD OF THE INVENTION

The present invention relates to a retention device, more particularly to a retention device for retaining position of a secondary part relative to a primary part with magnetic assistance.

DESCRIPTION OF THE PRIOR ART

In the mechanism of products, it is very common to use a retention device for fixing a component of a product in a steady position with another component of the product, after one of the two component is rotated with respect to the other. For example, a retention device is usually employed for fixing the pivot member with respect to the annular member after joining the two.

FIG. 1A illustrates a perspective view of a typical retention device 10, and includes a pivot shaft 11 and spring member 102.

The pivot shaft 11 is rotatably mounted on a mounting block. A pivot bump 101 is sleeved rotatably on the pivot shaft 11, is shaped into an undulate curve, and has a plurality of concave parts 1011 and a plurality of protrude parts 1012. The spring member 102 is sleeved around the pivot shaft 11 inboard to the pivot bump 101 for urging the pivot bump 101 away from the mounting block.

An annular bump 111 is mounted coaxially and securely on the pivot shaft 11 outboard to the pivot bump 101, is shaped into an undulate curve, and has a plurality of concave parts 1111 and a plurality of protrude parts 1112.

The annular bump 111 and the pivot bump 101 match in shape at the edges thereof so that these two things are tightly abutted before they are rotated. That is, the protrude part 1112 of the annular bump 111 is stuck into the concave part 1012 of the pivot bump so that the annular bump 111 is not likely to rotate due to the confinement from the pivot bump 101. In the way, the annular member 23 is confined to in position requested to meet the goal of position.

FIG. 1B illustrates an perspective view of the motion of the pivot shaft 11 rotating on the mounting block.

As shown in FIG. 1B, the user must exert some force to rotate the annular bump 111. At this time, the annular bump 111 will rotate and its protrude part 1112 will depart from the concave part 1011 of the pivot bump 101 and push toward the protrude part 1012 of the pivot bump 101 while the protrude part 1112 of the annular bump 111 pushes the protrude part 1012 of the pivot bump 101, thereby allowing the spring base 102 to gain the restoration force.

After the vertex of the protrude part 1112 of the annular bump 111 surpasses the vertex of the protrude part 1012 of the pivot bump 101, the protrude part 1112 of the annular bump 111 will again stick into the concave part 1011 of the pivot bump 101 gradually. The spring member 102 will also be released to rise gradually to prop up the annular bump 111 in order to keep it in abutment with the pivot bump 101.

After the protrude part of the annular bump 111 is stuck into another concave part again, as shown in the FIG. 1A, the annular bump 111 is 1 confined by the pivot bump 101 and not likely to rotate. Thus, the annular bump 111 is confined to another place requested to meet the goal of position.

However, the retention device described above doesn't meet the standards requested these days. For example, during the process of rotating, wearing at the edges is unavoidable over the extended use since these two bumps slide on each other. This may result in harsh rotation for the annular bump 111. Moreover, the spring is subjected to fatigue after long term use, and is unable to be compressed or extended sensitively, then the pivot bump 101 is unable to stick on the annular bump 111 tightly, which also results in harsh rotation and impacts the positioning effect.

Therefore, the present invention is to find a way to improve the structure of the retention device for overcoming the drawbacks encountered during use of the typical retention device.

SUMMARY OF THE INVENTION

The object of the present invention is to provide a position retention device.

According to the embodiment of the present invention, a position retention device includes: a pivot member having a mounting axle; a cylindrical seat mounted co-axially and securely on the mounting axle of the pivot member, and having pluralities of circumferentially formed north and south pole sectors, each of the north pole sectors being disposed between adjacent two of the south pole sectors; a cylindrical housing mounted co-axially and rotatably on the mounting axle of the pivot member; and an annular member disposed in the cylindrical housing for simultaneous rotation with the cylindrical housing, and having pluralities of circumferentially formed north and south pole sectors, each of the north pole sectors being disposed adjacent two of the south pole sectors. Position of the cylindrical housing is retained stationarily with respect to the cylindrical seat by virtue of attraction between one of the north pole sectors of the cylindrical seat and one of the south pole sectors of the annular member.

In a second aspect of the present invention, a position retention device is provided and includes: a pivot member having an upper portion and a mounting axle projecting upwardly from the upper portion; a cylindrical seat mounted co-axially on the mounting axle of the pivot member, and having pluralities of circumferentially formed north and south pole sectors, each of the north pole sectors being disposed between adjacent two of the south pole sectors; a cylindrical housing having a central hole to permit extension of the mounting axle of the pivot member so as to permit rotation of the cylindrical housing with respect to the cylindrical seat, the cylindrical housing further having an inner wall surrounding the cylindrical seat, and an outer wall cooperating with the inner wall to define the receiving chamber; and an annular member disposed within the annular receiving chamber in the cylindrical housing for simultaneous rotation with the cylindrical housing, and having pluralities of circumferentially formed north and south pole sectors, each of the north pole sectors being disposed adjacent two of the south pole sectors. Position of the cylindrical housing is retained stationarily with respect to the cylindrical seat by virtue of attraction between one of the north pole sectors of the cylindrical seat and one of the south pole sectors of the annular member adjacent to the one of the north pole sectors of the cylindrical seat.

In a third aspect of the present invention, a mobile phone is provided and includes: a primary part having a plurality of input keys and a pivot member which includes an upper portion and a mounting axle projecting upwardly from said upper portion; a cylindrical seat mounted co-axially on the mounting axle of the pivot member, and having pluralities of circumferentially formed north and south pole sectors, each of the north pole sectors being disposed between adjacent two of the south pole sectors; a secondary part having a display screen and a cylindrical housing sleeved rotatably around the cylindrical seat, the second part and the cylindrical housing being rotatable simultaneously with respect to the cylindrical seat; and an annular member disposed securely on the cylindrical housing, and having pluralities of circumferentially formed north and south pole sectors, each of the north pole sectors being disposed adjacent two of the south pole sectors. Position of assembly of the secondary part and the cylindrical housing is retained stationarily with respect to the primary part and the cylindrical seat by virtue of attraction between one of the north pole sectors of the cylindrical seat and one of the south pole sectors of the annular member adjacent to the one of the north pole sectors of the cylindrical seat.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1A:
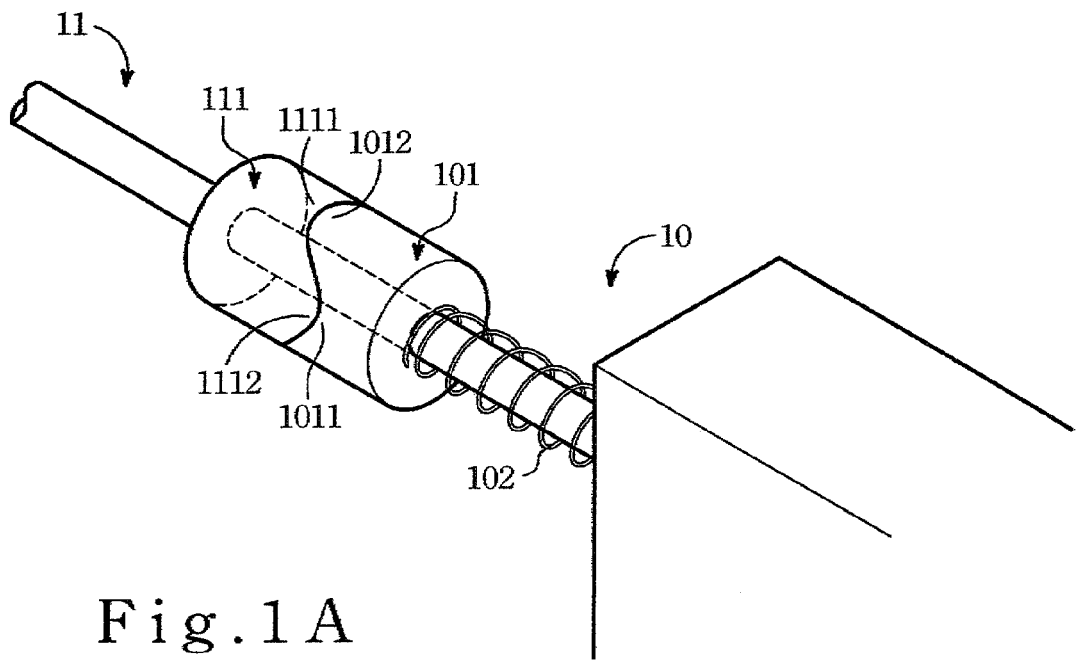
FIG. 1A is a perspective top view of a conventional position retention device.
Figure 1B:
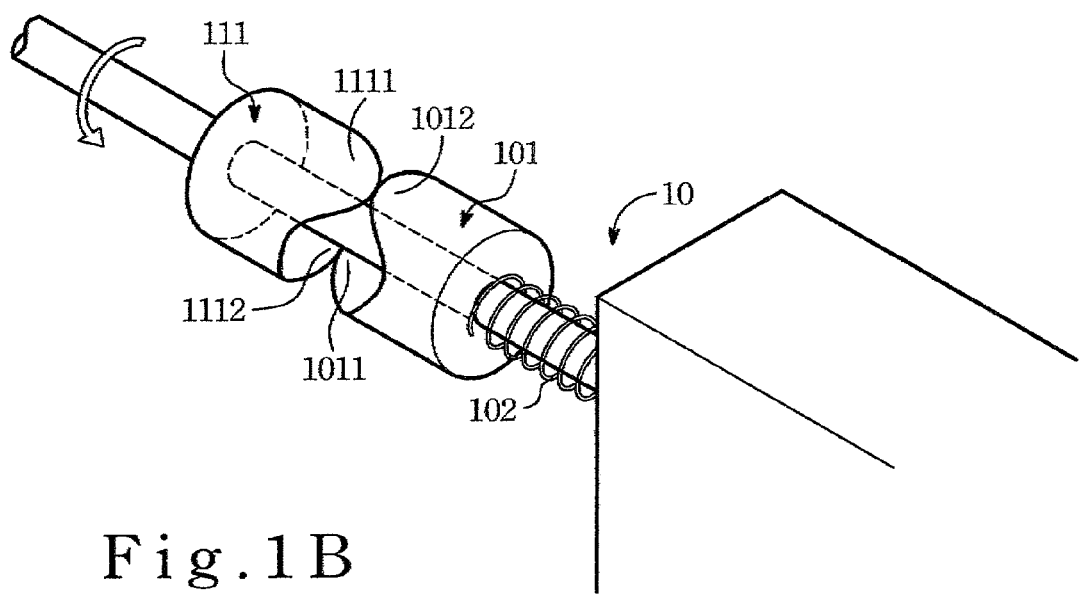
FIG. 1B is a perspective view illustrating how a first part is rotated with respect to a second part.

Before the present invention is described in greater detail with reference to the following preferred embodiments, it should be noted that same reference numerals have been used to denote similar elements throughout the specification.

Figure 2A:
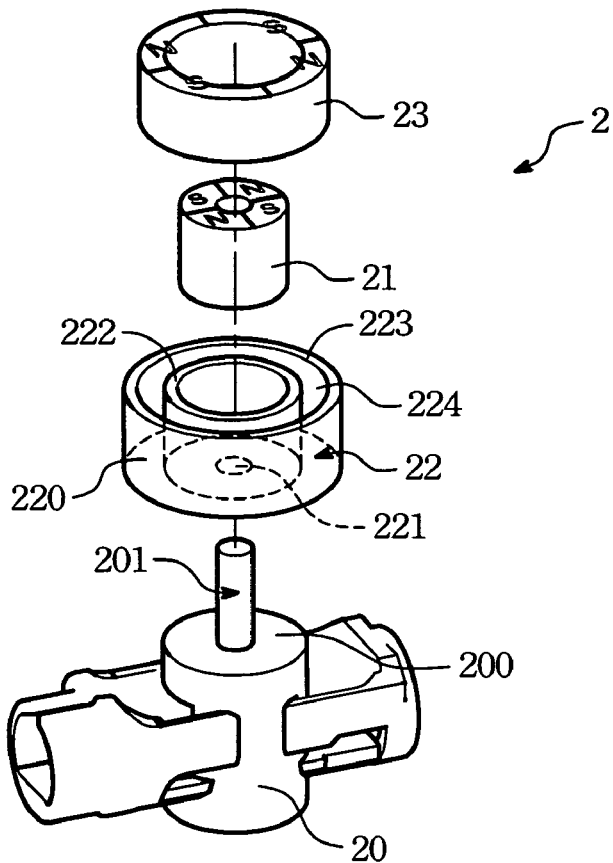
FIG. 2A is an exploded perspective view of the first embodiment of a position retention device of the present invention.

FIG. 2A illustrates an exploded perspective view of the first embodiment of a position retention device 2 to include a pivot member 20, a cylindrical seat 21, a cylindrical housing 22 and an annular member 23.

As illustrated, the pivot member 20 has an upper portion 200 and a mounting axle 201 projecting upwardly from the upper portion 200. The cylindrical seat 21 is mounted co-axially on the mounting axle 201 of the pivot member 21, and has pluralities of circumferentially formed north and south pole sectors. Each of the north pole sectors is disposed between adjacent two of the south pole sectors. The cylindrical housing 22 is mounted co-axially and rotatably on the mounting axle 201 of the pivot member, and has an annular receiving chamber 224. The annular member 23 is disposed within the receiving chamber 224 in the cylindrical housing 22 for simultaneous rotation with the cylindrical housing 22, and has pluralities of circumferentially formed north and south pole sectors. Each of the north pole sectors is disposed adjacent two of the south pole sectors.

Figure 2B:
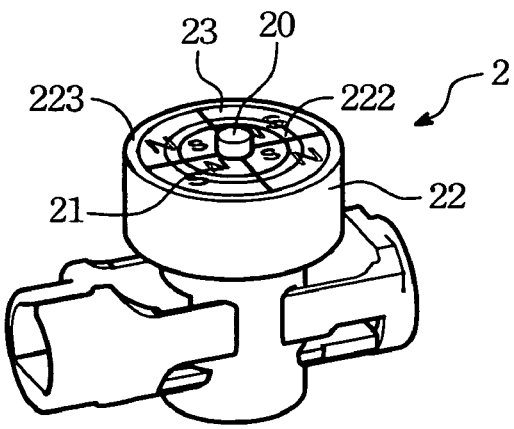
FIG. 2B is a perspective view of the first embodiment of the position retention device of the present invention.

Referring to FIG. 2B, after assembly, the position of the cylindrical housing 22 is retained stationarily with respect to the cylindrical seat 21 by virtue of attraction between one of the north pole sectors of the cylindrical seat 21 and one of the south pole sectors of the annular member 23 adjacent to the one of the north pole sectors of the cylindrical seat 21.

Figure 3A:
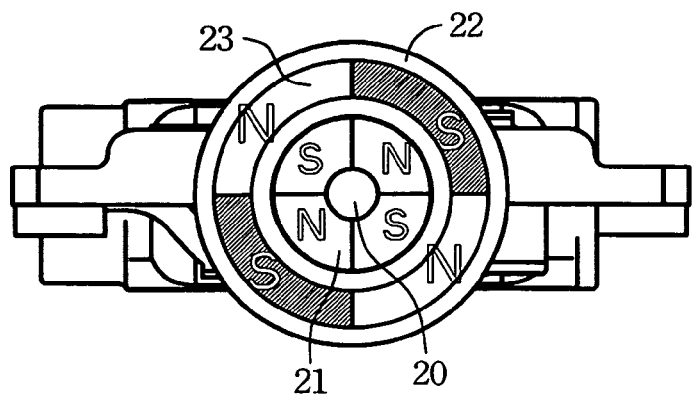
FIG. 3A is a first top planar view of the first embodiment of the position retention device of the present invention.
Figure 3B:
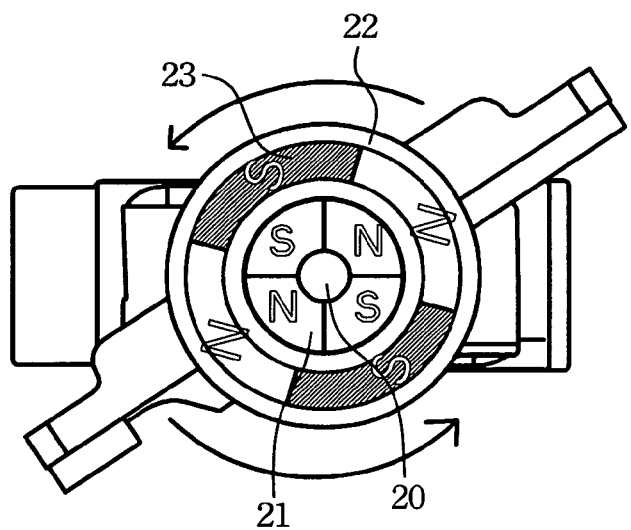
FIG. 3B is a top planar view illustrating how a cylindrical housing is rotated with respect to a cylindrical seat in the first embodiment of the position retention device according to the present invention.
Figure 3C:
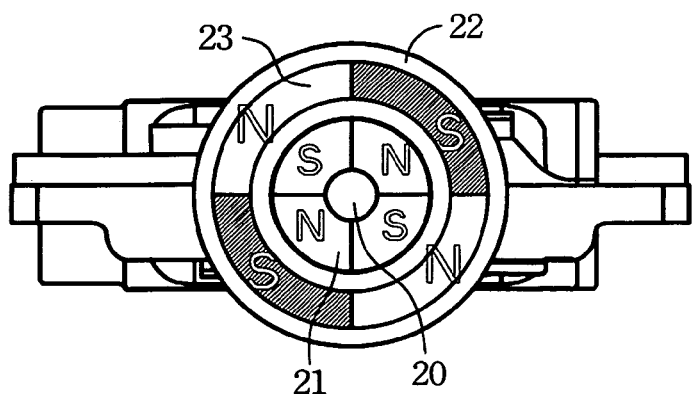
FIG. 3C is a second top planar view of the first embodiment of the position retention device of the present invention.

FIG. 3A illustrates a first top planar view of the first embodiment after assembly. In the event, the user wishes to change the position of the cylindrical housing 22 with respect to the cylindrical seat 21, he needs to hold two opposite sides of the cylindrical housing 22 and turn as shown in FIG. 3B, wherein the cylindrical housing 22 is retained stationarily with respect to the cylindrical seat 21 as shown in FIG. 3C. During turning of the cylindrical housing 22, the turning is enhanced once the south pole sector of the annular member 23 is in registry with the respective south pole section in the cylindrical seat 21 since an expelling force may present therebetween to quicken the rotation of the cylindrical housing 22 relative to the cylindrical seat 21.

Note that in this first embodiment, the receiving chamber 224 of the cylindrical housing 22 has a bottom portion 220 formed with a central hole 221 that is sleeved around the mounting axle 201 of the pivot member 20 to permit rotation of the cylindrical housing 22 with respect to the cylindrical seat 21. The cylindrical housing 22 further has an inner wall 222 extending upwardly from the bottom portion 220 surrounding the central hole 221, and an outer wall 223 extending upwardly from the bottom portion 220 and cooperating with the inner wall 222 to define the receiving chamber 224. The annular member 23 is attached securely on an outer surface of the inner wall 222 of the receiving chamber 224 in the cylindrical housing 22 for simultaneous rotation therewith. Alternately, the annular member 23 can be attached securely on an inner surface of the outer wall 223 of the receiving chamber 224 in the cylindrical housing 22 for simultaneous rotation therewith.

Figure 4:
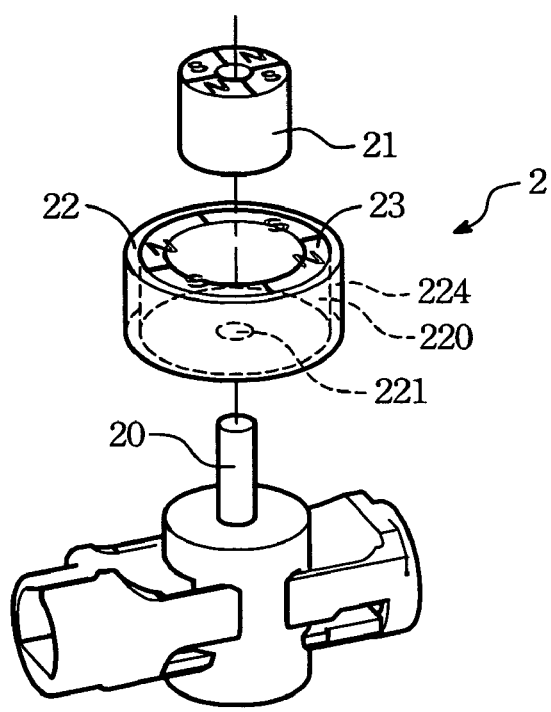
FIG. 4 is an exploded perspective view of the second embodiment of a position retention device of the present invention.

FIG. 4 is an exploded view of the second embodiment of the position retention device 2 of the present invention and has the structure generally similar to the first embodiment. The only difference resides in that the cylindrical housing 22 has a peripheral wall extending upwardly from the bottom portion 220. The inner surface of the peripheral wall confines an outer side of the receiving chamber 224. The annular member 23 is attached securely on the inner surface of the receiving chamber 224 for simultaneous rotation therewith.

Figure 5:
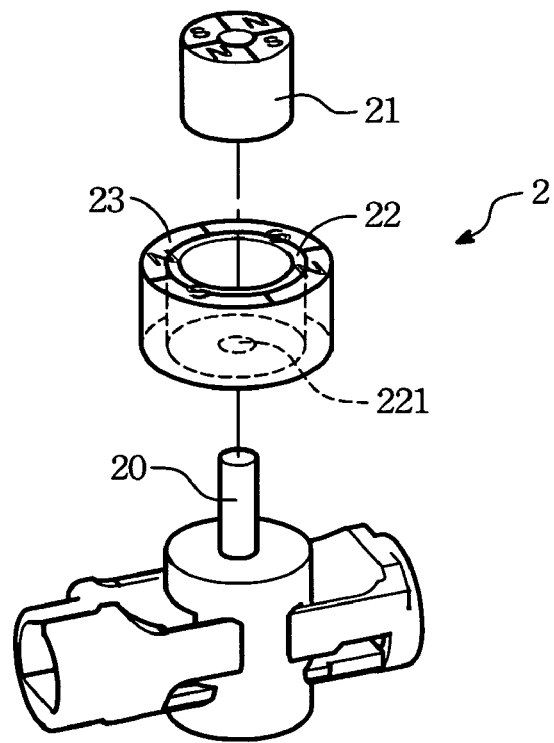
FIG. 5 is an exploded perspective view of the third embodiment of a position retention device of the present invention.

FIG. 5 is an exploded view of the third embodiment of the position retention device 2 of the present invention and has the structure generally similar to the second embodiment. The only difference resides in that the cylindrical housing 22 has a peripheral wall extending upwardly from the bottom portion 220. The outer surface of the peripheral wall confines the receiving chamber 224. The annular member 23 is attached securely on the outer surface of the peripheral wall of the cylindrical housing 22 for simultaneous rotation therewith.

Figure 6:
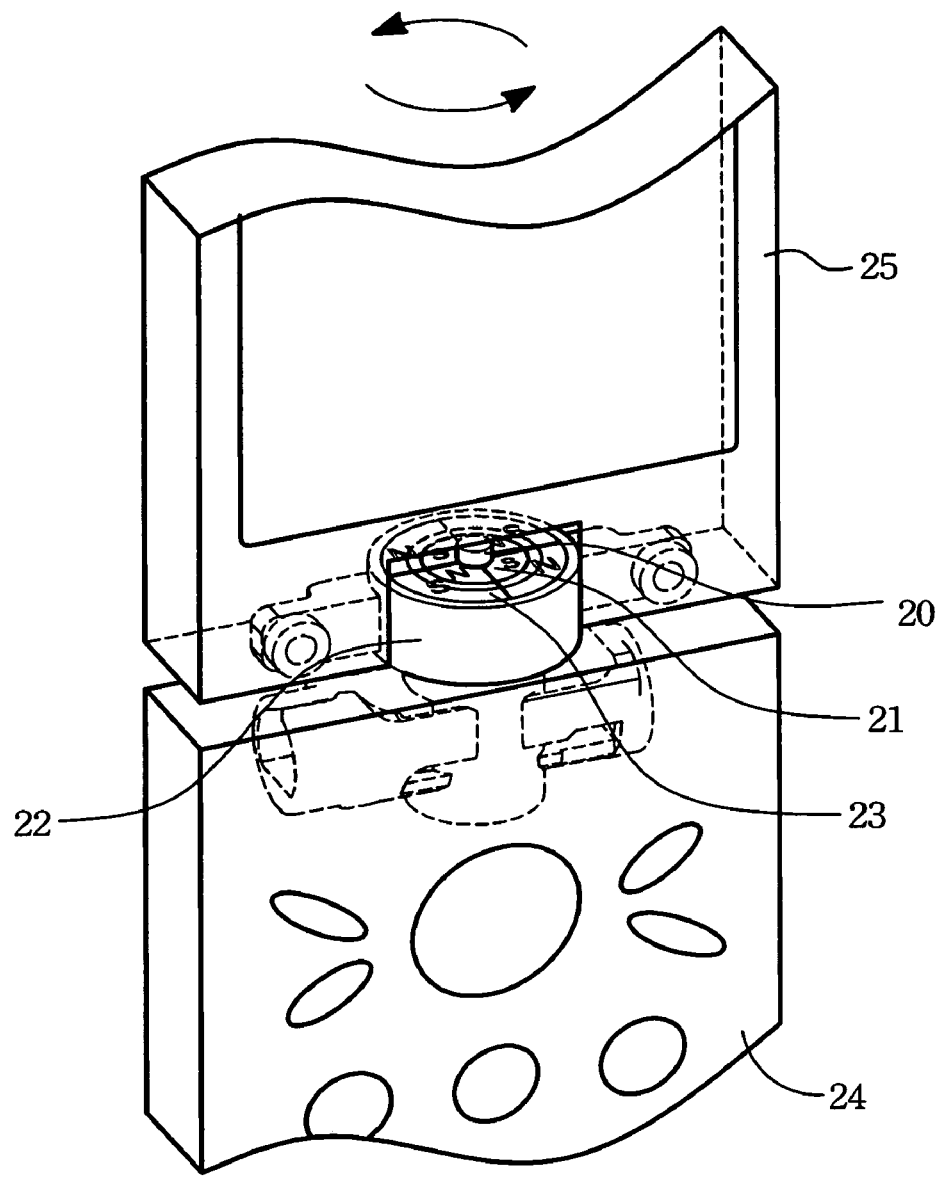
FIG. 6 illustrates how the first embodiment of the position retention device of the present invention employed in a mobile phone

FIG. 6 is a fragmentary sectional view of a mobile phone that includes a primary part 24 and a secondary part 25 coupled to the primary part 24 by using the first embodiment 2 of the present invention. The primary part 24 has a plurality of input keys 241 and a coupling end 240 pivoted to the left and right lateral sides of the pivot member 21 in such a manner that the upper portion 200 and the mounting axle 201 are exposed from the coupling end 240 of the primary part 24. The secondary part 25 has a display screen and a coupling end 250 fastened securely to the cylindrical housing 22 such that position of assembly of the secondary part 25 and the cylindrical housing 22 is retained stationarily with respect to the primary part 24 and the cylindrical seat 21 by virtue of attraction between one of the north pole sectors of the cylindrical seat 21 and one of the south pole sectors of the annular member 23 adjacent to said one of the north pole sectors of the cylindrical seat 21.

Figure 7:
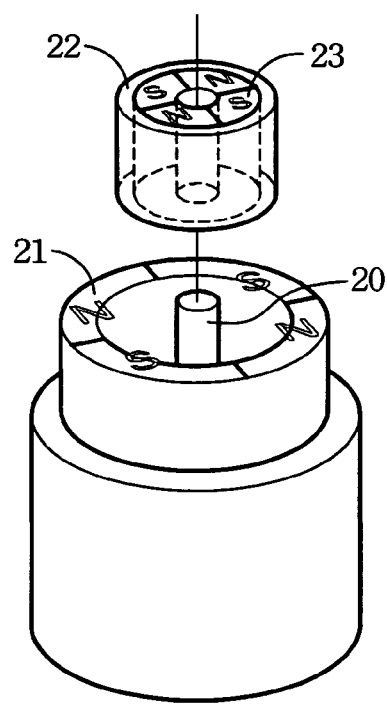
FIG. 7 is a partly exploded perspective view of the fourth embodiment of a position retention device of the present invention.

FIG. 7 shows a partly exploded view of the fourth embodiment of a position retention device of the present invention and has the structure similar to that shown in FIGS. 4 and 5. The only difference resides in that the cylindrical seat 21 has an inner diameter greater than an outer diameter of the cylindrical housing 22 such that the cylindrical seat 21 is disposed around the cylindrical housing 22. In case this fourth embodiment is employed in the mobile phone of FIG. 6, the coupling end of the secondary part should be fastened securely on the cylindrical seat 21.

Figure 8:
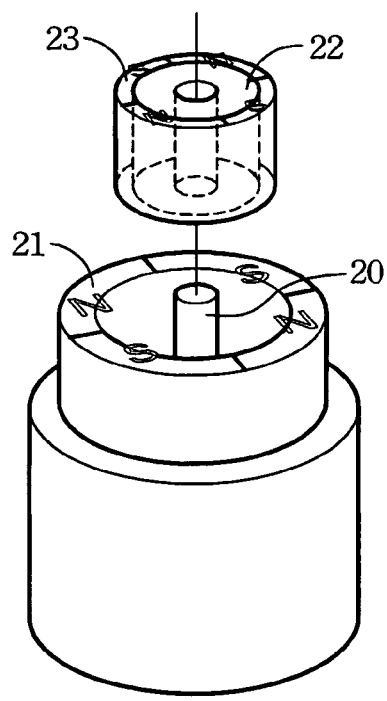
FIG. 8 is a partly exploded perspective view of the fifth embodiment of a position retention device of the present invention.

FIG. 8 shows a partly exploded view of the fifth embodiment of a position retention device of the present invention, and has the structure similar to that shown in FIGS. 4 and 5. The only difference resides in that the cylindrical seat 21 has an inner diameter greater than an outer diameter of the annular member 23 such that the cylindrical seat 21 is disposed around the annular member 23, which surrounds the cylindrical housing 22. In case this fifth embodiment is employed in the mobile phone of FIG. 6, the coupling end of the secondary part should be fastened securely on the cylindrical seat 21.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A position retention device comprising:
a pivot member having a mounting axle;
a cylindrical seat mounted co-axially on said mounting axle of said pivot member, and having pluralities of circumferentially formed north and south pole sectors, each of said north pole sectors being disposed between adjacent two of said south pole sectors;
a cylindrical housing mounted co-axially and rotatably on said mounting axle of said pivot member; and
an annular member disposed in said cylindrical housing for simultaneous rotation with said cylindrical housing, and having pluralities of circumferentially formed north and south pole sectors, each of said north pole sectors being disposed adjacent two of said south pole sectors;
wherein, position of said cylindrical housing is retained stationarily with respect to said cylindrical seat by virtue of attraction between one of said north pole sectors of said cylindrical seat and one of said south pole sectors of said annular member.

2. The position retention device according to claim 1, wherein said cylindrical housing has a central hole, said central hole being sleeved around said mounting axle.

3. The position retention device according to claim 1, wherein said cylindrical seat is mounted around said cylindrical housing and said annular member.

4. The position retention device according to claim 3, wherein said annular member is attached on outer surface of said cylindrical housing.

5. The position retention device according to claim 3, wherein said annular member is attached on inner surface of said cylindrical housing.

6. The position retention device according to claim 1, wherein said cylindrical seat is mounted around said pivot member.

7. The position retention device according to claim 6, wherein said annular member is disposed on outside surface of said cylindrical housing.

8. The position retention device according to claim 6, wherein said annular member is disposed on inner surface of said cylindrical housing.

9. A position retention device comprising:
a pivot member having an upper portion and a mounting axle projecting upwardly from said upper portion;
a cylindrical seat mounted co-axially on said mounting axle of said pivot member, and having pluralities of circumferentially formed north and south pole sectors, each of said north pole sectors being disposed between adjacent two of said south pole sectors;
a cylindrical housing having a central hole to permit extension of said mounting axle of said pivot member so as to permit rotation of said cylindrical housing with respect to said cylindrical seat, said cylindrical housing having an inner wall surrounding said cylindrical seat, and an outer wall cooperating with said inner wall to define a receiving chamber therebetween; and
an annular member disposed within said receiving chamber in said cylindrical housing for simultaneous rotation with said cylindrical housing, and having pluralities of circumferentially formed north and south pole sectors, each of said north pole sectors being disposed adjacent two of said south pole sectors;
wherein, position of said cylindrical housing is retained stationarily with respect to said cylindrical seat by virtue of attraction between one of said north pole sectors of said cylindrical seat and one of said south pole sectors of said annular member.

10. The position retention device according to claim 9, wherein said cylindrical housing has a bottom portion interconnecting said inner and outer walls, said central hole being formed through said bottom portion.

11. A mobile phone comprising:
a primary part having a plurality of input keys and a pivot member, which includes an upper portion and a mounting axle projecting upwardly from said upper portion;
a cylindrical seat mounted co-axially on said mounting axle of said pivot member, and having pluralities of circumferentially formed north and south pole sectors, each of said north pole sectors being disposed between adjacent two of said south pole sectors;
a secondary part having a display screen and a cylindrical housing sleeved rotatably around said cylindrical seat, said secondary part and said cylindrical housing being rotatable simultaneously with respect to said cylindrical seat; and
an annular member disposed securely on said cylindrical housing, and having pluralities of circumferentially formed north and south pole sectors, each of said north pole sectors being disposed adjacent two of said south pole sectors;
wherein, position of an assembly of said secondary part and said cylindrical housing is retained stationarily with respect to said primary part and said cylindrical seat by virtue of attraction between one of said north pole sectors of said cylindrical seat and one of said south pole sectors of said annular member.

12. The mobile phone according to claim 11, wherein said cylindrical housing has a central hole for extension of said mounting axle of said pivot member therethrough.

13. The mobile phone according to claim 11, wherein said cylindrical seat has an outer diameter, said cylindrical housing having an inner diameter that is greater than said outer diameter of said cylindrical seat.

* * * * *